United States Patent
Kollbach et al.

(10) Patent No.: US 9,458,363 B2
(45) Date of Patent: Oct. 4, 2016

(54) POLYURETHANE LAMINATION ADHESIVE

(75) Inventors: Guido Kollbach, Apex, NC (US); Rene Sauer, Dusseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 806 days.

(21) Appl. No.: 12/483,644

(22) Filed: Jun. 12, 2009

(65) Prior Publication Data

US 2010/0010156 A1 Jan. 14, 2010

Related U.S. Application Data

(63) Continuation of application No. PCT/EP2007/060190, filed on Sep. 26, 2007.

(30) Foreign Application Priority Data

Dec. 14, 2006 (DE) .................. 10 2006 059 464

(51) Int. Cl.
| | | |
|---|---|---|
| *B32B 7/12* | (2006.01) | |
| *B32B 27/00* | (2006.01) | |
| *C08G 18/08* | (2006.01) | |
| *C08G 18/12* | (2006.01) | |
| *C08G 18/42* | (2006.01) | |
| *C08G 18/76* | (2006.01) | |
| *C09J 175/04* | (2006.01) | |

(52) U.S. Cl.
CPC .............. *C09J 175/04* (2013.01); *B32B 7/12* (2013.01); *B32B 27/00* (2013.01); *C08G 18/08* (2013.01); *C08G 18/12* (2013.01); *C08G 18/4202* (2013.01); *C08G 18/4252* (2013.01); *C08G 18/7671* (2013.01)

(58) Field of Classification Search
CPC .. C08G 18/08; C08G 18/12; C08G 18/4202; C08G 18/4252; C08G 18/7671; C09J 175/04; B32B 7/12; B32B 27/00
USPC ........ 524/507, 589, 590; 525/418, 451, 452, 525/453, 454, 455, 523, 528; 428/423.1, 428/34.1, 34.8, 35.2, 35.7, 35.8; 156/327, 156/330, 331.4, 331.7, 332
See application file for complete search history.

(56) References Cited

U.S. PATENT DOCUMENTS

| | | | | |
|---|---|---|---|---|
| 3,644,569 | A | * | 2/1972 | Pietsch et al. .................. 525/28 |
| 3,663,513 | A | | 5/1972 | Kazama et al. |
| 4,487,910 | A | | 12/1984 | Bauriedel |
| 4,623,709 | A | | 11/1986 | Bauriedel |
| 4,654,409 | A | | 3/1987 | Shirai et al. |
| 5,804,672 | A | | 9/1998 | Bolte et al. |
| 5,880,167 | A | | 3/1999 | Krebs et al. |
| 6,274,674 | B1 | * | 8/2001 | Chang et al. ................. 525/129 |
| 6,515,164 | B1 | | 2/2003 | Bolte et al. |
| 7,129,312 | B1 | | 10/2006 | Krebs et al. |
| 2002/0157780 | A1 | * | 10/2002 | Onusseit .................... 156/273.7 |
| 2004/0014847 | A1 | | 1/2004 | Bolte et al. |
| 2004/0259968 | A1 | | 12/2004 | Krebs |
| 2005/0020706 | A1 | | 1/2005 | Kollbach et al. |
| 2007/0088145 | A1 | * | 4/2007 | Mgaya et al. .................. 528/44 |
| 2007/0129525 | A1 | | 6/2007 | Eichelmann et al. |
| 2008/0233397 | A1 | * | 9/2008 | Cattron et al. ................ 428/392 |

FOREIGN PATENT DOCUMENTS

| | | |
|---|---|---|
| DE | 35 29 176 | 2/1986 |
| DE | 10055786 | 5/2002 |
| EP | 0019120 A1 | 11/1980 |
| EP | 0485008 | 5/1992 |
| EP | 827995 A2 * | 3/1998 |
| JP | 580 08 773 | 1/1983 |
| RU | 2 162 480 | 1/2001 |
| RU | 2 272 818 | 3/2006 |

* cited by examiner

*Primary Examiner* — Patrick Niland
(74) *Attorney, Agent, or Firm* — James E. Piotrowski

(57) ABSTRACT

The invention relates to a polyurethane adhesive for laminating films. The adhesive contains at least one NCO-reactive polyurethane prepolymer and/or polyisocyanates and a compound having a molecular weight below 2000 g/mol and containing at least one functional group reactive with primary amino group selected from an epoxide groups, (meth)acrylic groups or carboxylic anhydride group. The adhesive is particularly well suited for multilayer films, especially for laminating foodstuffs or medical packaging.

16 Claims, No Drawings

POLYURETHANE LAMINATION ADHESIVE

CROSS REFERENCE TO RELATED APPLICATIONS

This application is a continuation of PCT/EP2007/060190 filed Sep. 26, 2007, which claims the benefit of DE 10 2006 059 464.9, filed Dec. 14, 2006, the complete disclosures of which are hereby incorporated by reference in their entirety.

The invention relates to an NCO-reactive polyurethane adhesive which is suitable for bonding films. On storage and after further processing, the bonded multilayer films comprise a reduced proportion of primary aromatic amines.

Laminating adhesives are generally known in industry. They are solvent-containing or solvent-free, crosslinking or physically setting adhesives which serve to bond thin, two-dimensional substrates, such as for example plastics films, metal foils, paper or cardboard, to one another. It is here essential that the adhesive bond only slightly reduces the flexibility of the thin individual plies. Selection of the individual film plies makes it possible to influence specific characteristics of these multilayer films, in particular permeability to water or other liquids, chemical resistance, permeability to oxygen or other gases.

It is furthermore known that packaging is manufactured from such multilayer films. Foodstuffs in solid, pasty or liquid form may, for example, be packaged in such packages. Everyday items, for example plastic cutlery, may also be packaged. Such packaging is also suitable for holding medical materials or articles.

The above-stated fields of application mean that as far as possible no low molecular weight substances should migrate out of the packaging into the package contents. Such substances may be flavor-impairing substances or the corresponding substances may have a deleterious effect on health if ingested. In the case of films bonded with polyurethanes, such substances may in particular comprise breakdown products from the isocyanate precursors used, for example from the hydrolyzed polyisocyanates. Primary amines, in particular primary aromatic amines, may here be formed from such polyisocyanate precursors. These are known to impair health. There are accordingly various standards which specify a maximum content of such primary aromatic amines in films suitable for packaging.

It is conventional to use low molecular weight isocyanates in the synthesis of polyurethane adhesives. For chemical reasons, it is impossible to prevent small proportions of monomeric isocyanates from also being present in the adhesive. In a further group of polyurethane adhesives, oligomeric isocyanates are added to the adhesive to improve specific characteristics. These are intended to react with crosslinking agents, for example polyols, or with water, in order to yield a crosslinked adhesive. In this case too, proportions of oligomeric isocyanates remain in the adhesive after bonding. When such objects are exposed to moisture over extended storage, it is known that such isocyanate groups react and, since only small proportions of isocyanate groups are present, these groups are then consumed by reaction to yield amino groups. Over time, such primary amines may then migrate into their surroundings. This is in particular the case with low molecular weight hydrolysis products.

If high molecular weight polyisocyanate prepolymers are used, it is however possible during the sterilization of the films which is frequently required for amino groups to form during the process by hydrolytic dissociation from the urethane or urea groups formed on crosslinking. Such hydrolytic processes are in particular known in the case of sterilization with exposure to moisture and at elevated temperature. Here too, primary aromatic amines are then formed which can migrate into the material.

Such migrated substances are unwanted, particularly in the packaging sector, specifically in foodstuffs packaging. In order to avoid the above-stated disadvantages, EP-A 0 118 065 proposes producing polyurethane prepolymers in a two-stage process, in which, in a first stage, a monocyclic diisocyanate is initially reacted with a polyfunctional alcohol and then, in a second step, a diisocyanate is reacted with polyfunctional alcohols with an excess of isocyanate in the presence of the prepolymer produced in the first step. The mixture produced in this manner has a reduced content of monomeric isocyanates.

DE-A 34 01 129 relates to a process for the production of polyurethane prepolymers, in which polyfunctional alcohols are initially reacted with the more rapidly reacting isocyanate group of an asymmetric diisocyanate while retaining the more slowly reacting group, the reaction products are then combined with a symmetrical diisocyanate, the isocyanate groups of which react more rapidly than the slow reacting groups of the first stated polyfunctional isocyanate compound. The described polyurethane prepolymers likewise have a reduced content of monomeric aromatic isocyanates.

EP-A 0 019 120 relates to a process for producing elastic, weather-proof flat products. A two-stage process is proposed for this purpose, in which in a first stage tolylene diisocyanate (TDI) is reacted with at least equimolar quantities of a polyol and the resultant reaction product is then reacted with diphenylmethane diisocyanate (MDI) and a polyol. The polyurethane binders obtainable in this manner are capable as an adhesive of curing with water or with atmospheric humidity. While the described process does indeed result in products with a relatively low viscosity, a content of free, highly volatile diisocyanate is however always still present and can only be reduced by applying time-consuming and energy-intensive methods for removing excess, highly volatile diisocyanate, for example film distillation.

The object of the present invention is therefore to provide polyurethane adhesives which, after crosslinking, yield an adhesive which, on extended storage or on sterilization, have a reduced content of primary amines, in particular of primary aromatic amines.

The object is achieved by providing a polyurethane adhesive for laminating films, the PUR adhesive containing at least one NCO-reactive polyurethane prepolymer and/or polyisocyanates, wherein the PUR adhesive contains between 0.5 and 20% by weight of a low molecular weight compound (A) which contains at least one group reactive with primary amino groups selected from epoxide groups, (meth)acrylic groups or carboxylic anhydride groups.

The invention furthermore relates to the provision of a process for producing multilayer films which contain only a reduced content of primary aromatic amines capable of migration. The invention furthermore relates to the use of such polyurethane adhesives as a laminating adhesive.

Polyurethane adhesives are generally known. They are also used for laminating multilayer films. The adhesives suitable according to the invention are one-component polyurethane adhesives or two-component polyurethane adhesives. The adhesives may be liquid, but they may also be hot-melt adhesives. The adhesives may contain solvent, but they are preferably solvent-free. Crosslinking of the polyurethane adhesives suitable according to the invention is based on the reaction of reactive NCO groups, in particular aromatic NCO groups, with H-acidic functional groups, for example OH groups, amino groups or carboxyl groups. An alternative crosslinking method involves the reaction of the NCO groups with moisture from the applied adhesive, the substrate or the surroundings with formation of urea groups. These crosslinking reactions are known and they may also proceed concurrently. The adhesives conventionally contain catalysts, for example amine or tin catalysts, to accelerate such reactions.

Known coating material or adhesive polyisocyanates may be used, these comprising polyisocyanates having two or more isocyanate groups. Suitable polyisocyanates are for example 1,5-naphthylene diisocyanate (NDI), 2,4- or 4,4'-diphenylmethane diisocyanate (MDI), hydrogenated MDI (H12MDI), xylylene diisocyanate (XDI), tetramethylxylylene diisocyanate (TMXDI), di- and tetraalkylene diphenylmethane diisocyanate, 4,4'-dibenzyl diisocyanate, 1,3- or 1,4-phenylene diisocyanate, tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane 1,4-diisocyanate, butane 1,4-diisocyanate, hexane 1,6-diisocyanate (HDI), dicyclohexylmethane diisocyanate, cyclohexane 1,4-diisocyanate, ethylene diisocyanate, methylene triphenyl triisocyanate (MIT), phthalic acid bis-isocyanatoethyl ester, trimethylhexamethylene diisocyanate, 1,4-diisocyanatobutane, 1,12-diisocyanatododecane and dimer fatty acid diisocyanate.

Suitable at least trifunctional isocyanates are polyisocyanates which are obtained by trimerization or oligomerization of diisocyanates or by reaction of diisocyanates with low molecular weight polyfunctional compounds containing hydroxyl or amino groups. Commercially obtainable examples are trimerization products of the isocyanates HDI, MDI or IPDI or adducts of diisocyanates and low molecular weight triols, such as trimethylolpropane or glycerol.

Aliphatic, cycloaliphatic or aromatic isocyanates may in principle be used, but aromatic isocyanates are particularly suitable. The polyurethane adhesives according to the invention may contain the isocyanates in reacted form as polyurethane prepolymers or they contain at least a proportion of low molecular weight oligomeric isocyanates.

According to the invention, the polyurethane adhesives should contain at least one polyol. This may comprise an individual polyol or preferably a mixture of two or more polyols. Suitable polyols are aliphatic and/or aromatic alcohols with 2 to 6, preferably 2 to 4, OH groups per molecule. The OH groups may be both primary and secondary.

Suitable aliphatic alcohols include, for example, ethylene glycol, propylene glycol, 1,4-butanediol, 1,5-pentanediol, 1,6-hexanediol, 1,7-heptanediol, 1,8-octanediol and the higher homologues or isomers thereof. More highly functional alcohols are likewise suitable, such as for example glycerol, trimethylolpropane, pentaerythritol and oligomeric ethers of the stated substances.

Reaction products of low molecular weight polyfunctional alcohols with alkylene oxides are preferably used as the polyol component. The alkylene oxides preferably have 2 to 4 C atoms. The reaction products of ethylene glycol, propylene glycol, the isomeric butanediols, hexanediol or 4,4'-dihydroxydiphenylpropane with ethylene oxide, propylene oxide or butylene oxide, or mixtures of two or more thereof are, for example, suitable. The reaction products of polyfunctional alcohols, such as glycerol, trimethylolethane or trimethylolpropane, pentaerythritol or sugar alcohols, or mixtures of two or more thereof, with the stated alkylene oxides to form polyether polyols are furthermore also suitable. Further polyols usual for the purposes of the invention are obtained by polymerization of tetrahydrofuran (polyTHF).

Polyethers which have been modified by vinyl polymers are likewise suitable for use as the polyol component. Such products are for example obtainable by polymerizing styrene or acrylonitrile or a mixture thereof in the presence of polyethers.

Further suitable polyols are polyester polyols. Examples of these are polyester polyols, which are obtained by reacting low molecular weight alcohols, in particular ethylene glycol, diethylene glycol, neopentyl glycol, hexanediol, butanediol, propylene glycol, glycerol or trimethylolpropane with caprolactone.

Further suitable polyester polyols may be produced by polycondensation. Such polyester polyols preferably comprise the reaction products of polyfunctional, preferably difunctional alcohols and polyfunctional, preferably difunctional and/or trifunctional carboxylic acids or polycarboxylic anhydrides. Compounds suitable for producing such polyester polyols are in particular hexanediol, 1,4-hydroxymethylcyclohexane, 2-methyl-1,3-propanediol, 1,2,4-butanetriol, triethylene glycol, tetraethylene glycol, ethylene glycol, polyethylene glycol, dipropylene glycol, polypropylene glycol, dibutylene glycol and polybutylene glycol. Proportions of trifunctional alcohols may also be added.

The polycarboxylic acids may be aliphatic, cycloaliphatic, aromatic or heterocyclic or both. They may optionally be substituted, for example by alkyl groups, alkenyl groups, ether groups or halogens. Suitable polycarboxylic acids are for example succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, glutaric anhydride, maleic acid, maleic anhydride, fumaric acid, dimer fatty acid or trimer fatty acid or mixtures of two or more thereof. Proportions of tricarboxylic acids may optionally also be added.

It is, however, also possible to use polyester polyols of oleochemical origin. Such polyester polyols may for example be produced by complete ring opening of epoxidized triglycerides of a fat mixture containing at least in part an olefinically unsaturated fatty acid with one or more alcohols having 1 to 12 C atoms and subsequent partial transesterification of the triglyceride derivatives to yield alkyl ester polyols having 1 to 12 C atoms in the alkyl residue. Further suitable polyols are polycarbonate polyols and dimer diols (from Henkel) and castor oil and the derivatives thereof. Hydroxy-functional polybutadienes, as are for example available under the trade name poly-BD, may be used as polyols for the compositions according to the invention.

Polyacetals are likewise suitable as the polyol component. Polyacetals are taken to mean compounds as are obtainable from glycols, for example diethylene glycol or hexanediol or mixtures thereof, with formaldehyde. Polyacetals which are usable for the purposes of the invention may likewise be obtained by polymerization of cyclic acetals. Polycarbonates are furthermore suitable as polyols. Polycarbonates may, for example, be obtained by the reaction of diols, such as propylene glycol, 1,4-butanediol or 1,6-hexanediol, diethylene glycol, triethylene glycol or tetraethylene glycol or mixtures of two or more thereof with diaryl carbonates, for example diphenyl carbonate, or phosgene. Hydroxy esters of polylactones are likewise suitable. Another group of polyols may be OH-functional polyurethane polyols.

Polyacrylates bearing OH groups are likewise suitable as a polyol component. These polyacrylates may, for example, be obtained by the polymerization of ethylenically unsaturated monomers which bear an OH group. Ethylenically unsaturated carboxylic acids suitable for this purpose are for example acrylic acid, methacrylic acid, crotonic acid or maleic acid or the esters thereof with $C_1$ to $C_2$ alcohols. Corresponding esters bearing OH groups are for example 2-hydroxyethyl acrylate, 2-hydroxyethyl methacrylate, 2-hydroxypropyl acrylate, 2-hydroxypropyl acrylate, 2-hydroxypropyl methacrylate, 3-hydroxypropyl acrylate or 3-hydroxypropyl methacrylate or mixtures of two or more thereof.

Polyurethane prepolymers may be produced in known manner from the above-mentioned polyols and polyisocyanates. A prepolymer containing NCO groups may here be produced from the polyols and isocyanates. Examples thereof are described in EP-A 951493, EP-A 1341832, EP-A 150444, EP-A 1456265, WO 2005/097861. The corresponding polyurethane prepolymers may be formulated with likewise per se known further auxiliary substances to form laminating adhesives.

Such adhesives may optionally also contain organic solvents, provided that these do not react with the isocyanate groups present.

The resultant polyurethane prepolymers have isocyanate groups which are reactive with OH groups or water. They have a molar mass of 500 to 20,000 g/mol (number average molecular weight, determinable by gel permeation chromatography, GPC). The viscosity of the prepolymers at the adhesive application temperature in a temperature range from 20° C. to 100° C. should be in the range from 500 to 25,000 mPa·s (measured to Brookfield ISO 2555, at stated temperature).

In addition to the above-mentioned known constituents, a polyurethane adhesive according to the invention must contain low molecular weight oligomeric compounds which contain functional groups reactive with primary amino groups. Low molecular weight should be taken to mean a molecular weight of below 2000 g/mol. These are compounds which contain at least 2 up to 10 reactive groups capable of reacting with amines, in particular with primary amines. Examples of such functional groups are carboxylic anhydride groups, epoxide groups or in particular (meth) acrylic groups. The amino groups which are present or form in the crosslinked adhesive in particular comprise primary aromatic amino groups. This reaction for scavenging the amino groups may optionally be assisted by catalysts.

It is preferred for the low molecular weight amino-reactive compounds to comprise a plurality of functional groups. The molecular weight of the resultant reacted products may be increased in this manner. Accordingly, not only is the quantity of primary aromatic amino groups reduced, but furthermore the resultant reaction products are of high molecular weight, such that they themselves also have reduced migration ability.

The low molecular weight amino-reactive compounds (A) may comprise for example oligomeric polyesters of unsaturated carboxylic acids. Polyols having 2 to 10 OH groups may, for example, be esterified with (meth)acrylic acid. Other suitable acids are for example itaconic acid, crotonic acid, maleic acid, fumaric acid, citraconic acid, cinnamic acid, vinylsulfonic acid, vinylphosphonic acid or the derivatives thereof. The corresponding amides which may be produced by reacting primary or secondary polyamine compounds with the above-stated unsaturated carboxylic acids may likewise be used.

A further group of usable low molecular weight amine-reactive groups are oligomers which contain acid anhydride groups. These may for example comprise anhydrides of di- to deca-functional unsaturated carboxylic acids, such as fatty acids; aromatic polycarboxylic acids, such as phthalic acid, isophthalic acid, terephthalic acid; aliphatic carboxylic acids such as citric acid, trimellitic acid. It is possible for these polycarboxylic acids to contain still further carboxylic acid ester groups in addition to the necessary acid anhydride groups. Mixed acid anhydrides may also be present.

A further group of low molecular weight amine-reactive groups are oligomeric epoxides. These may comprise glycidyl esters of polycarboxylic acids; the conventional known polycarboxylic acids may be used. It is furthermore possible to react low molecular weight polyacrylic acids with glycidyl alcohols. A further possibility involves epoxidizing low molecular weight unsaturated compounds on at least one double bond. Examples of such compounds are epoxidized polybutadienes.

It is essential to the invention for these low molecular weight amine-reactive compounds to have a molecular weight of below 2000 g/mol, in particular of below 1000 g/mol. If the molecular weights are too high, the mobility of these compounds in the crosslinked adhesive is low, as a result of which reactivity with the primary amino groups is reduced. It is furthermore possible for these low molecular weight oligomers to contain additional OH groups. These OH groups should preferably exhibit a reactivity which is lower than the reactivity of the majority of the OH groups of the optionally present polyol crosslinking agents. In this way, it is possible to ensure that, if free NCO groups are still present, these can react with the low molecular weight compounds once the crosslinked adhesive has formed.

The low molecular weight compounds bearing amino-reactive groups should be incorporated as stably as possible into the polyurethane adhesive. This may be achieved by good compatibility of the compounds with the polyurethane prepolymer. In one embodiment of the invention, it is also possible for such compounds which are suitable according to the invention additionally to contain H-acidic groups, such as for example OH groups. In the case of such OH groups, in particular primary or secondary OH groups, it is possible for these to react in the crosslinking reaction of the polyurethane prepolymer with the NCO groups which are present. The migration ability of these compounds which comprise such amino-reactive groups is accordingly reduced.

The amino-reactive compounds should be present in a quantity of 0.5 to 20% by weight, in particular the quantity should amount to between 1 to 15% by weight relative to the entire adhesive. According to the invention, the polyurethane adhesives should contain no reactive amino groups before the crosslinking reaction, such that no premature reaction with the additional amine-reactive compound occurs during storage of the adhesives. The reaction of the primary amino group with the oligomer proceeds slowly relative to the crosslinking reaction of the isocyanate groups. Only once the isocyanate groups have reacted with the H-acidic groups to yield urethanes or ureas is it possible for the primary, in particular aromatic, amino groups which have formed to be consumed by a slower reaction. It is optionally possible for the polyurethane adhesives also to contain catalysts which promote the reaction between primary aromatic amino groups and the amino-reactive groups. Alkaline catalysts which promote a [reaction] with activated double bonds may, for example, be present. It is furthermore possible to use electrophilic catalysts which for example facilitate reaction with epoxide groups.

The adhesive according to the invention may furthermore contain conventional additives. The further constituents comprise for example resins (tackifiers), catalysts based on organometallic compounds or tertiary amines, such as tin compounds or DABCO, stabilizers, crosslinking agents or viscosity regulators, fillers or pigments, plasticizers or antioxidants.

One-component polyurethane adhesives in general contain one or more NCO-reactive polyurethane prepolymers. These conventionally crosslink on exposure to water, as a constituent of the substrate to be bonded or from the air, to form adhesives. Two-component polyurethane adhesives contain a component which contains the above-stated polyurethane prepolymers or the above-stated polyisocyanates. H-acidic polymers, for example the above-mentioned polyols, polyamides or polymers containing SH-groups may be used as the second crosslinking component. Immediately before application, the two components are mixed and a reactive adhesive is obtained. This must be processed before the crosslinking reaction progresses.

The polyurethane adhesives according to the invention are liquid at application temperatures, either at room temperature or as a hot-melt adhesive. They are applied using conventional apparatus onto the substrates to be bonded, in particular films, and then bonded to one another in known manner. It is here convenient optionally to use elevated temperatures in order to achieve better application and a more rapid crosslinking reaction.

The polyurethane adhesives according to the invention are in particular suitable as laminating adhesives. They may be used in a process in which known films based on polymers, such as PP, PE, OPA, polyamide, PET, polyester, metal foils are bonded to one another. The adhesive according to the invention is here applied onto an optionally pretreated or printed film. This may proceed at elevated temperature in order to obtain a thin and uniform coating. A second film of identical or a different material is then laminated thereon under pressure. Heat may be applied, the adhesive crosslinks and a multilayer film is obtained. The latter may optionally also consist of more than two layers.

The films are conventionally placed in storage after production. During this time, the adhesives according to the invention may crosslink further. The primary amino groups which arise, in particular primary aromatic amino groups, react over this time with the amine-reactive compounds which are additionally present. This gives rise to reaction products which comprise no active amine functions and which can no longer migrate.

It is furthermore possible on subsequent processing of the films for a step of heating the bonded multilayer films to be provided. This may, for example, also proceed in a moist atmosphere, for example on sterilization. At these elevated temperatures too, it is possible according to the invention for the primary aromatic amines which arise to react with the functional groups of the low molecular weight compound which are still present in the crosslinked laminating adhesive layer.

Thanks to the use of the liquid or hot-melt adhesives according to the invention as the laminating adhesive, it is possible to obtain laminated two-layer or multilayer films which meet the stringent requirements for suitability for foodstuffs or medical packaging. In particular, it is possible to achieve a distinct reduction in the content of primary aromatic amines, which are extracted from the film in the relevant test methods. In particular, it is possible to obtain films which have a primary aromatic amine content of less than 10 µg/1 l of extraction solution, measured to EEC 2002/72. The effect is here observable immediately after crosslinking of the adhesive, but it is however also encountered after subsequent sterilization.

Thanks to the polyurethane adhesives according to the invention, which may contain aromatic polyisocyanates and/or polyurethane prepolymers based on aromatic isocyanates, it is possible to produce adhesives which are outstandingly suitable as a laminating adhesive. Application properties, crosslinking and adhesion of the films to one another are very good. However, bonding with the adhesives according to the invention gives rise to only very small quantities of primary aromatic amines capable of migration in the adhesive layer and said amines are strongly bound in the film. This property is also retained in a multilayer film according to the invention if it is also subjected to sterilization or other heating to an elevated temperature over the course of its production process.

The following Examples illustrate the invention.

EXAMPLE 1

| | |
|---|---|
| Polyester polyol 1 (OH value 60) | 16.5% |
| Reaction product of a mixture of aromatic and aliphatic dicarboxylic acids with polyether diols (molar weight <200 g/mol) | |
| Polyester polyol 2 (OH value 60) | 30.5% |
| Reaction product of a mixture of aromatic and aliphatic dicarboxylic acids with low molecular weight aliphatic diols (fewer than 20 C atoms) | |
| MDI | 13% |
| Ethyl acetate | 40% |
| Characteristic values | |
| Solids content | approx. 67% |
| Viscosity | 150 to 500 mPa · s (20° C.) |
| NCO value | 2.2% |

EXAMPLE 2

| | |
|---|---|
| Polyester polyol 1 (OH value 60) | 13.2% |
| Polyester polyol 2 (OH value 60) | 24.4% |
| MDI | 10.4% |
| Ethyl acetate | 32% |
| Polymeric acrylate additive | 20% |
| Reaction product of trimethylolpropane and methacrylic acid (approx. 390 g/mol) | |
| Characteristic values | |
| Solids content | 69% |
| Viscosity | 150 to 500 mPa · s (20° C.) |
| NCO value | 1.8% |

EXAMPLE 3

| | |
|---|---|
| Polyester polyol 1 | 14.85% |
| Polyester polyol 2 | 27.45% |
| MDI | 11.7% |
| Ethyl acetate | 36% |
| Epoxidized polymer additive | 10% |
| Epoxidized polybutadiene, approx. 1400 g/mol | |
| Characteristic values | |
| Solids content | 63% |
| Viscosity | 300 to 1000 mPa · s (20° C.) |
| NCO value | 2.0% |

Production Process

The polyester polyols are initially introduced into ethyl acetate and mixed. MDI is then added and the reaction temperature adjusted to 70° C. Once the NCO value has been achieved, the solution is allowed to cool. The additives are then added at a temperature of <50° C. and homogenized.

A polyol (OH value approx. 350) is mixed into the prepolymer solution of Examples 1 to 3 in a ratio of 20:1 (slight NCO excess). The resultant adhesive is applied onto a PET/AI composite film in a film thickness of approx. 5 μm. This film is laminated to a conventional commercial CPP film. The composite films cure thoroughly over 7 days.

500 cm² pouches are produced from these films by heat-sealing the edges. The pouches are filled with water, sealed and then sterilized (121° C., 30 minutes). Primary aromatic amine (PAA) migration is determined according to EEC 2000/72. Portions of film are determined after lamination, after curing and after the sterilization process.

The concentration values in comparison test 1 are set at 100. It is found that the measured values in tests 2 and 3 amount to 50% of the comparison values after one day's curing, and to 30 to 40% of the comparison values after 7 days' curing after sterilization.

The invention claimed is:

1. A process for bonding multilayer film using a polyurethane laminating adhesive comprising:
    providing at least one reactive polyurethane prepolymer containing NCO-groups and/or polyisocyanates containing NCO-groups;
        providing 0.5 to 20 wt. %, based on the adhesive, of a compound A, wherein compound A i) has a molecular weight below 2000 g/mol and ii) contains at least one epoxide group which is reactive with a primary amino group;
        mixing the at least one reactive polyurethane prepolymer and the compound A to form the polyurethane laminating adhesive, the laminating adhesive being liquid at room temperature;
    applying the adhesive onto a first film;
    laminating a second film on the adhesive under pressure;
    crosslinking the adhesive only by reaction of the NCO-groups with H-acidic functional groups or moisture to bond the first film to the second film thereby forming a multilayer laminate, wherein primary amines are formed during crosslinking; and
    reacting the primary amines in the crosslinked adhesive with compound A.

2. The process according to claim 1, wherein the film has been pretreated or printed.

3. The process according to claim 1, wherein the film is PP, PE, OPA, polyamide, PET, polyester and/or metal foil.

4. The process according to claim 1, further comprising heating the multilayer film at 30 to 60° C.

5. The process according to claim 4, further comprising sterilizing the multilayer film.

6. The process according to claim 1, wherein the adhesive comprises at least one catalyst for an amine-double bond addition reaction.

7. The process according to claim 1, wherein the compound A is an epoxidized polybutadiene.

8. A polyurethane laminating adhesive comprising:
    a) at least one reactive polyurethane prepolymer containing NCO-groups and/or polyisocyanates containing NCO-groups; and
    b) 0.1 to about 80 weight %, based on the adhesive, of epoxidized polybutadiene;
    wherein the adhesive is a polyurethane system which crosslinks only by the reaction of NCO groups with H-acidic functional groups or with moisture and the adhesive is liquid at room temperature.

9. The process according to claim 1, wherein the compound A has a molecular weight below 1000 g/mol and contains 2-10 functional groups reactive with primary amino groups.

10. The process according to claim 1, wherein the compound A further comprises OH groups.

11. The process according to claim 1, wherein the polyisocyanates are present in the form of an aromatic polyisocyanates and/or polyurethane prepolymer based on aromatic polyisocyanates.

12. The process according to claim 1, wherein the compound A has a plurality of epoxide groups.

13. The process according to claim 1, wherein the functional groups on compound A are terminal or lateral.

14. The process according to claim 1, wherein the compound A is present in an amount ranging from 1 to 15% by weight.

15. The process according to claim 1, wherein the adhesive further comprises at least one of a tackifier, catalyst, stabilizer, crosslinking agent, viscosity regulator, filler, pigment, plasticizer and antioxidant.

16. An article of manufacture made by the process of claim 1.

* * * * *